(12) United States Patent
Resler

(10) Patent No.: US 10,859,817 B2
(45) Date of Patent: *Dec. 8, 2020

(54) TECHNIQUES FOR SUPPRESSING MULTIPLE RESONANCE MODES IN A QUASI-STATICALLY OPERATED MOVABLE MIRROR

(71) Applicant: STMicroelectronics Ltd, Netanya (IL)

(72) Inventor: Avi Resler, Tel Aviv (IL)

(73) Assignee: STMicroelectronics Ltd, Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,495

(22) Filed: Dec. 3, 2019

(65) Prior Publication Data

US 2020/0103645 A1 Apr. 2, 2020

Related U.S. Application Data

(63) Continuation of application No. 15/945,570, filed on Apr. 4, 2018, now Pat. No. 10,527,842.

(51) Int. Cl.
*G02B 26/10* (2006.01)
*H04N 9/31* (2006.01)
*G02B 26/08* (2006.01)

(52) U.S. Cl.
CPC ....... *G02B 26/105* (2013.01); *G02B 26/0833* (2013.01); *H04N 9/3129* (2013.01); *G02B 26/085* (2013.01); *G02B 26/0841* (2013.01); *G02B 26/0858* (2013.01)

(58) Field of Classification Search
CPC .. G02B 26/10; G02B 26/105; G02B 26/0833; G02B 26/12; G02B 26/121; G02B 26/122; H04N 9/31; H04N 9/3129; H04N 9/3139; G03B 21/005; G03B 21/008; G03B 21/2033
See application file for complete search history.

(56) References Cited

U.S. PATENT DOCUMENTS

| | | |
|---|---|---|
| 2002/0134929 A1 | 9/2002 | Wine et al. |
| 2006/0284790 A1 | 12/2006 | Tegreene et al. |
| 2007/0063134 A1 | 3/2007 | Wine et al. |
| 2019/0020860 A1 | 1/2019 | McVittie |
| 2019/0235229 A1 | 8/2019 | Ujiie et al. |

*Primary Examiner* — William C. Dowling
(74) *Attorney, Agent, or Firm* — Crowe & Dunlevy

(57) ABSTRACT

A controller chip includes processing circuitry configured to process received samples by estimating trend functions from the samples, subtracting the trend functions from the samples to produce de-trended samples, performing a mathematical transform on the de-trended samples to produce frequency bins. The frequency bins may correspond to unwanted resonance movement of a movable mirror associated with the received samples. The processing circuit further generates an error function from the frequency bins. The error function can be used to generate correction signals for the movable mirror that serve to minimize the error function.

25 Claims, 5 Drawing Sheets

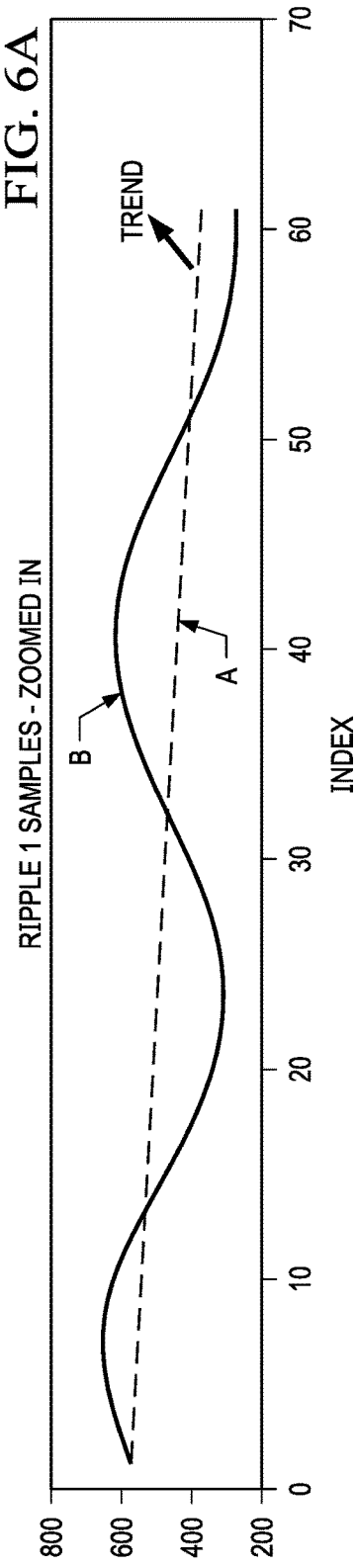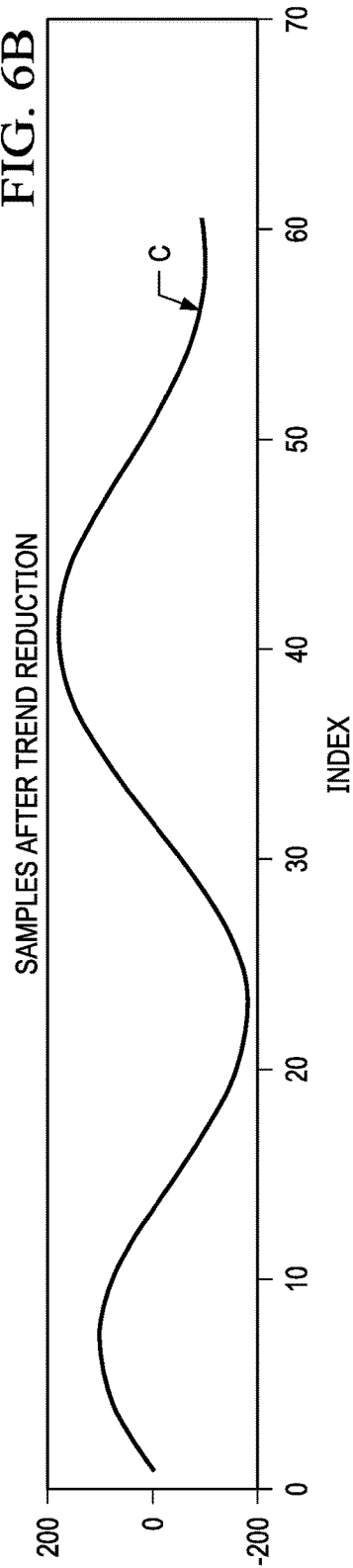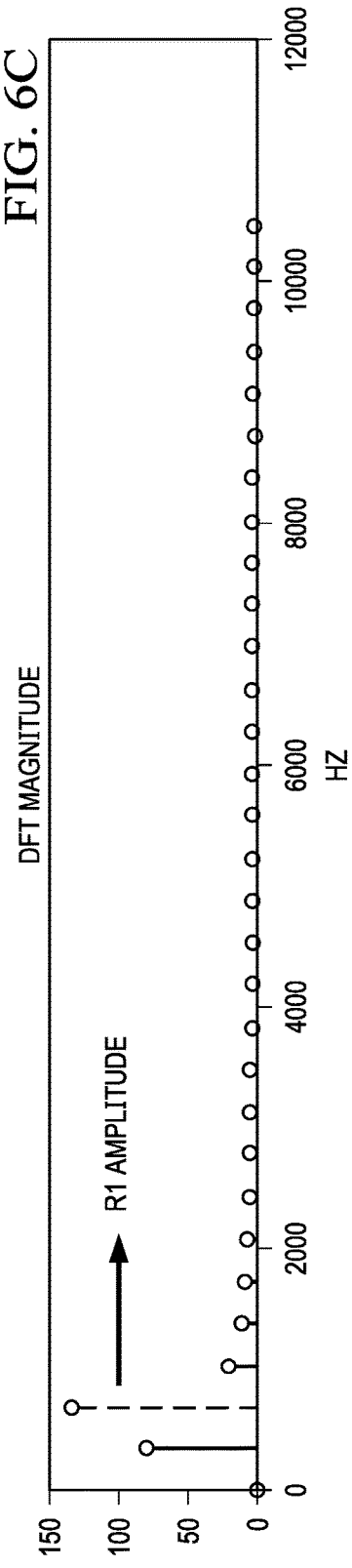

TECHNIQUES FOR SUPPRESSING MULTIPLE RESONANCE MODES IN A QUASI-STATICALLY OPERATED MOVABLE MIRROR

RELATED APPLICATION

This application is a continuation of U.S. patent application Ser. No. 15/945,570, filed on Apr. 4, 2018, now U.S. Pat. No. 10,527,842, the contents of which are incorporated by reference in their entirety.

TECHNICAL FIELD

This disclosure relates generally to image projection and, more particularly, to techniques for use by laser scanning projectors (used for image projection) to suppress multiple unwanted resonance modes that arise in quasi-statically operated movable mirrors when those quasi-statically operated movable mirrors are driven in a non-linear fashion, or when such mirrors are driven in a linear mode.

BACKGROUND

Laser scanning projectors constructed from microelectromechanical system (MEMS) components can be relatively small, and therefore implemented into easily portable devices such as picoprojectors. These laser scanning projectors can be used to display fixed or moving video images on a screen, wall, lens (in the case of a smartglass wearable), or user's skin (in the case of a smartwatch wearable). Since modern digital media is often in a high definition format, it is desirable for such laser scanning projectors to be capable of image display in high definition.

In general, MEMS laser scanning projectors function by optically combining red, green, and blue laser beams to form an RGB laser beam, and then directing the RGB laser beam to either a bi-axial mirror, or a set of two uni-axial mirrors working in tandem, with one of the axes being a fast axis and the other axis being a slow axis. Driving of slow axis movement of the mirror (whether it be a bi-axial mirror or a uni-axial mirror) is performed quasi-statically and linearly, typically at a low frequency of around 60 Hz.

This linear slow-axis movement drives the mirror from its minimal angle to its maximal angle in two phases. In a "trace" phase, the mirror is driven slowly from its minimal angle to its maximal angle linearly, while the RGB laser beam is directed so as to impinge upon the mirror. In a "retrace mode", the mirror is driven quickly back from its maximal angle to its minimal angle linearly, while the RGB laser is modulated so that it is not impinging upon the mirror.

Shown via the lines of 8 of FIG. 1A is a graph of a driving signal for the mirror versus time, when quasi-statically and linearly driven. As can be observed, in the trace phase 10A, the drive signal rises from a minimal amount to a maximal amount of 1 in 15 milliseconds, and in the retrace phase 10B, the signal drops from the maximal amount to zero in under two milliseconds. A second cycle is shown, with the trace phase 11A and retrace phase 11B.

In some cases, non-linear drive may be desired during the trace mode. With a non-linear drive during the trace mode, shown as the line 9 in FIG. 1A, the trace phase 10A is separated into three zones, namely a first projection zone 1A during which the RGB laser is directed so as to impinge upon the mirror, a dead zone 2A during which the RGB laser is modulated so that it is not impinging upon the mirror, and a second projection zone 3A during which the RGB laser is directed so as to impinge upon the mirror. Since the RGB laser is not to impinge upon the mirror in the dead zone 2A, movement of the mirror can be sped up during the dead zone as 2A compared to movement during the first and second projection zones 1A, 3A.

The fast transitions between the first projection zone and dead zone, and between the dead zone and second projection mode, introduce unwanted resonance into the mirror movement. This is shown in FIG. 1B, where the actual movement 15 of the mirror itself when driven by the non-linear drive signal 9 is shown compared to the non-linear drive signal 9. It can be observed that the actual movement 15 is comprised of oscillations or "ripples" that indicate unwanted resonant movement. Movement during the retrace phase can also contribute to ripple—in general, any drive modes of the mirror that are not smooth cause ripple.

Note that ripples are similarly present in the actual movement 12 of the mirror when driven by the linear drive signal 8. Prior art ripple suppression techniques are capable of attenuating the ripples present when the linear drive signal 8 is used, however, these prior art ripple suppression techniques do not function when the non-linear drive signal 9 is used.

Therefore, further development is required.

SUMMARY

Disclosed herein is an electronic device including a controller (such as a chip). The controller configured to: receive a feedback signal from a movable mirror driven by a drive signal; sample the feedback signal while the movable mirror moves to produce first and second sets of samples of the feedback signal; process the first set of samples to produce a first ripple measurement; process the second set of samples to produce a second ripple measurement; and generate first and second correction signals as a function of the first and second ripple measurements, the first and second correction signals for correcting the drive signal so that unwanted resonance movement of the movable mirror is attenuated.

Also disclosed herein is a controller including processing circuitry configured to process received samples by: estimating trend functions from the samples; subtracting the trend functions from the samples to produce de-trended samples; performing a mathematical transform on the de-trended samples to produce frequency bins corresponding to unwanted resonance movement of a movable mirror associated with the received samples; generating an error function from the frequency bins; and generating correction signals for the movable mirror that serve to minimize the error function.

Also disclosed herein is a laser scanning projector including: a laser source configured to emit a laser; a movable mirror driven by a drive signal; and a drive circuit configured to generate a drive signal such that as the movable mirror moves in accordance with the drive signal, unwanted resonance movement of the movable mirror occurs. A controller of the laser scanning projector is configured to: receive a feedback signal from the movable mirror while the movable mirror moves in accordance with the drive signal; process the feedback signal to produce ripple measurements; generate correction signals as a function of the ripple measurements; and cause the drive circuit to apply the correction signals to the drive signal so that the unwanted resonance movement of the movable mirror is attenuated.

BRIEF DESCRIPTION OF THE DRAWINGS

FIG. 6A shows the ripples in the samples of the first projection section and a determined trend line for those samples.

FIG. 6B shows samples of the first projection section after trend reduction.

FIG. 6C shows results of a discrete Fourier transform performed on the de-trended samples of FIG. 6B.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1A:
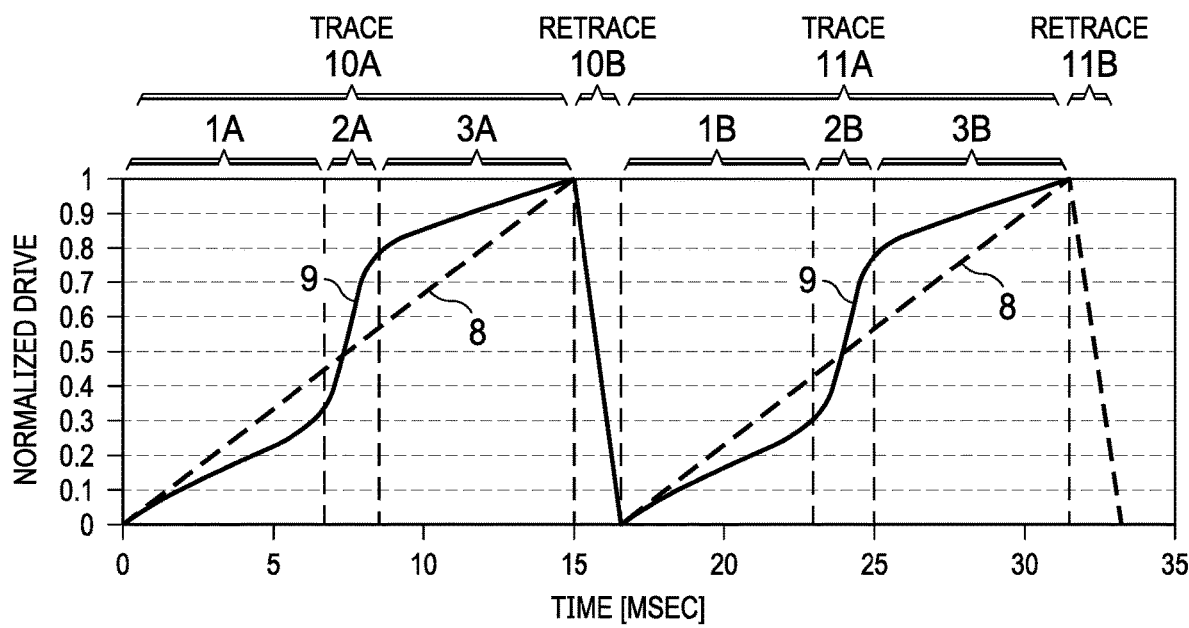
FIG. 1A is a graph of drive signals for a movable mirror in both a linear drive mode and a non-linear drive mode.
Figure 1B:
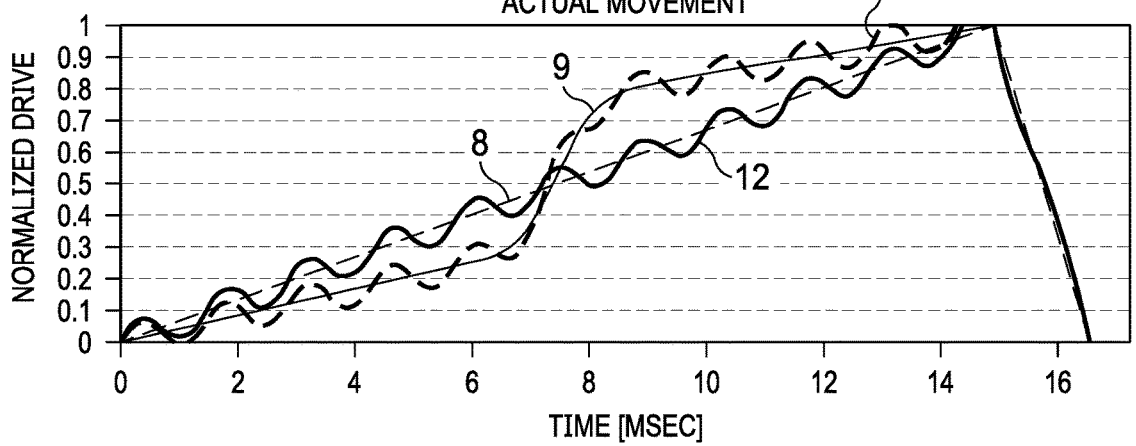
FIG. 1B is a graph of drive signals for a movable mirror vs. actual movement of the movable mirror in both a linear drive mode and a non-linear drive mode.
Figure 2A:
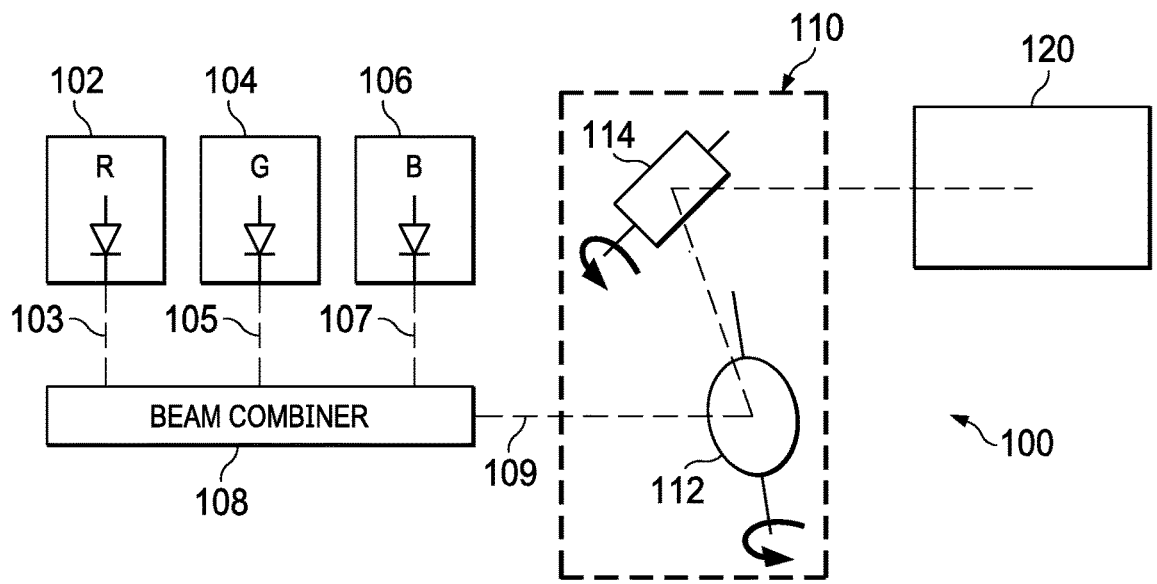
FIG. 2A is a block diagram of a laser scanning projector on which the control techniques and methods described herein may be performed.

Described herein with initial reference to FIG. 2A is a laser scanning projector 100, such as may be used in a self-contained pico-projector or a pico-projector unit incorporated within a portable device such as a smartphone. The laser scanning projector 100 includes a red laser 102, green laser 104, and blue laser 106. These lasers 102, 104, 106 operate to generate beams of collimated light 103, 105, 107 which are combined by a beam combiner 108 into an RGB laser or RGB beam of collimated light 109.

A mirror apparatus 110 receives the RGB laser 109 and reflects it onto a target 120. In greater detail, the mirror apparatus 110 includes a fast axis mirror 112 receiving the RGB laser 109 and reflecting it toward a slow axis mirror 114, which in turn reflects it onto the target 120. The fast axis mirror 112 is controlled to scan the RGB laser 109 between set travel limits for the fast axis, and the slow axis mirror 114 is controlled to scan the RGB laser 109 between set travel limits for the slow axis. The fast axis is typically a horizontal axis while the slow axis is typically the vertical axis, although in some cases the converse may be true.

The fast axis mirror 112 may be a resonating mirror, while the slow axis mirror 114 may be a quasi-static mirror. The slow axis mirror 114 may be displaced using magnetic, electrostatic, or piezoelectric forces. The fast axis mirror likewise may be displaced using magnetic, electrostatic, or piezoelectric forces. In some cases, instead of a separate fast axis mirror 112 and a separate slow axis mirror 114, a single biaxial mirror may be used that is driven on both a fast axis and a slow axis.

Figure 2B:
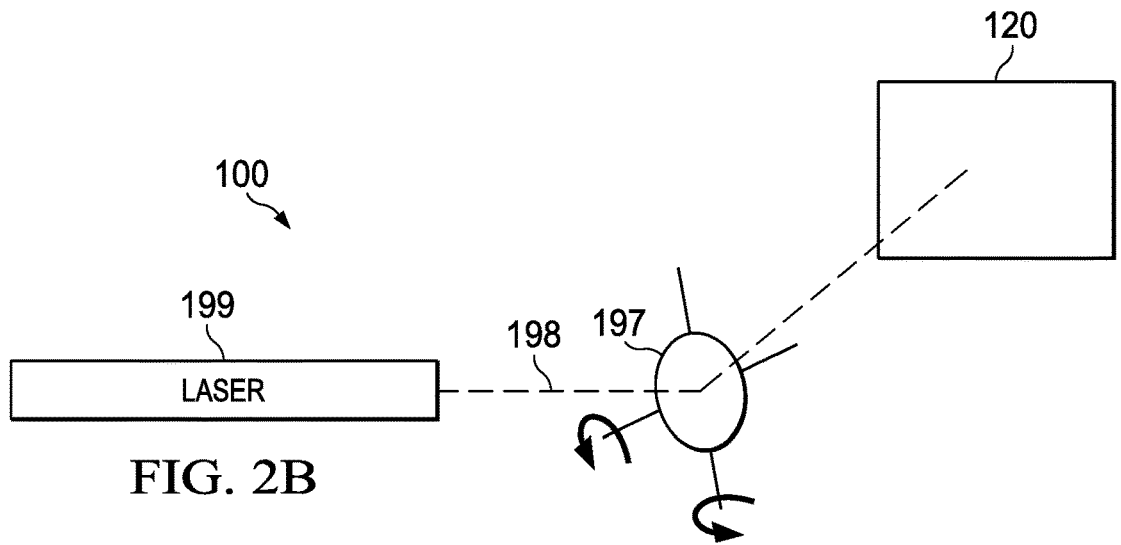
FIG. 2B is a block diagram of another configuration of laser scanning projector on which the control techniques and methods described herein may be performed.

In some instances, such as shown in FIG. 2B the laser scanning projector 100 includes a single laser 199, such as an infrared laser, that emits a laser beam 198 toward a mirror 197, which in turn reflects the laser beam 198 onto the target 120. The mirror 197 is biaxial, and thus is driven on both a fast axis and a slow axis. In other cases, the mirror 197 may instead use a mirror apparatus 110 with both a fast axis mirror 112 and slow axis mirror 114, such as shown in FIG. 2A.

Figure 3:
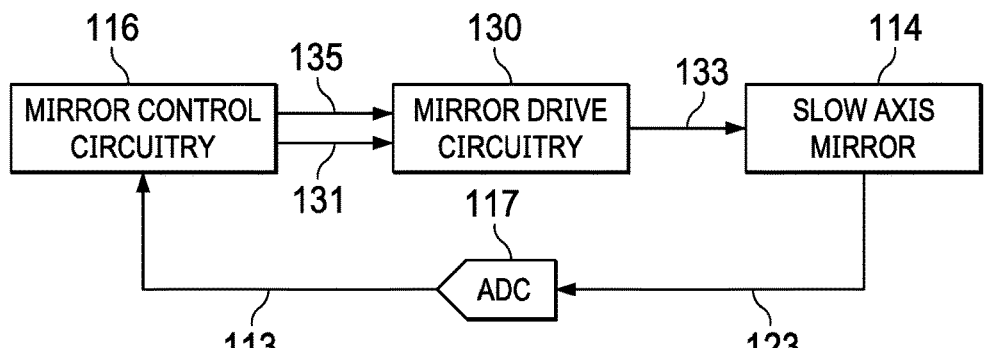
FIG. 3 is a further block diagram of the laser scanning projector of FIG. 2A in which the mirror control circuitry is shown.

As shown in FIG. 3, viewed in conjunction with FIG. 2A, the laser scanning projector 100 includes mirror drive circuitry 130, which generates a drive signal 133 for the slow axis mirror 114. This drive signal 133 is a non-linear drive signal (which will be described in greater detail below) that drives the slow axis mirror 114 quasi-statically. An analog to digital converter (ADC) 117 receives a feedback signal 123 generated by the slow axis mirror 114, and digitizes the feedback signal 123 so as to produce a digital feedback signal 113.

Mirror control circuitry 116 receives the digital feedback signal 113, processes the digital feedback signal 113 (as will be described below), and generates control signal 131 for the mirror drive circuitry 130 based upon that processing. The mirror control may be a microprocessor, an application specific integrated circuit (ASIC), or other suitable programmable device.

Figure 4:
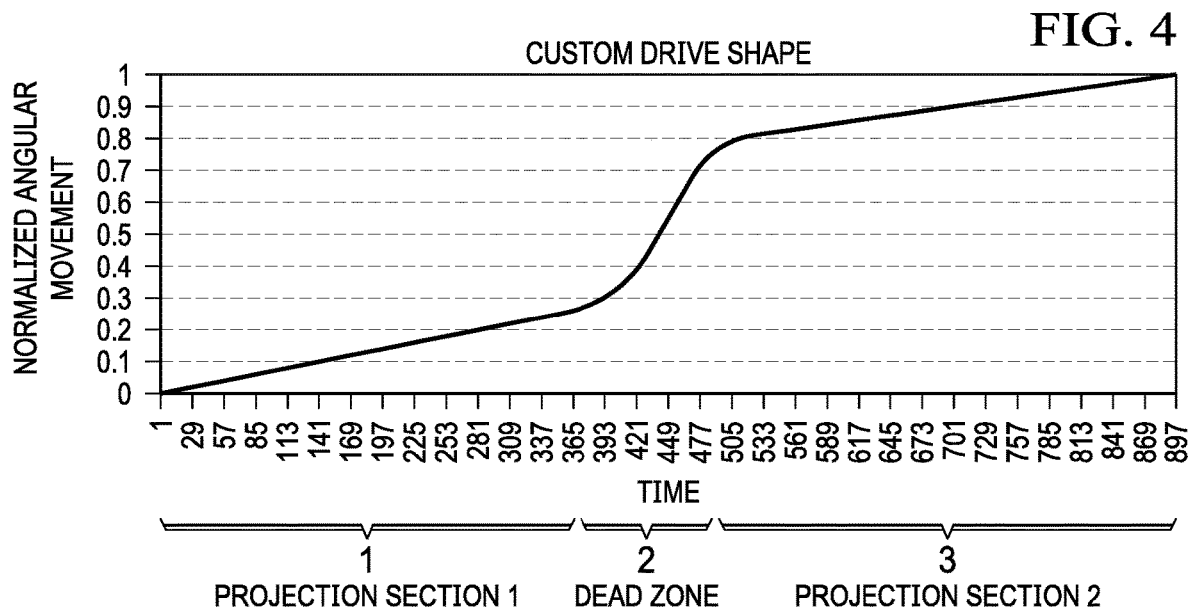
FIG. 4 is a graph showing the non-linear drive signal of FIG. 3 during the trace phase.

The mirror drive circuitry 130 generates the drive signal 133 as a function of the control signal 131. As stated, the drive signal 133 is non-linear, specifically during the trace mode. As shown in FIG. 4, the trace mode is separated into three zones: a first projection zone 1 during which the RGB laser 109 is modulated as to impinge upon the slow axis mirror 114, a dead zone 2 during which the RGB laser 109 is modulated so that it is not impinging upon the slow axis mirror 114 (e.g. is not present), and a second projection zone 3 during which the RGB laser 109 is again modulated so as to impinge upon the slow axis mirror 114. Since the RGB laser 109 is not to impinge upon the slow axis mirror 114 in the dead zone 2, movement of the slow axis mirror 114 can be sped up during the dead zone as 2 compared to movement during the first 1 and second 3 projection zones. This is effectuated by the increase in slope of the drive signal 133 shown in FIG. 4. Thus induces ripple, as does retrace during the retrace mode. However, it should be understood that the below techniques may be used during any drive move, including linear.

While movement during each of the first projection zone 1, dead zone 2, and second projection zone 3 can be considered to be substantially linear, the transition between the first projection zone 1 to the dead zone 2, and the transition between the dead zone 2 to the second projection zone 3, is not linear. Due to this, as well as due to the non-linearity of the movement during the entire trace phase (since the movement is quicker during the dead zone 2), the drive signal 133 overall is not considered to be linear during the trace mode, although it is considered to be linear during the retrace mode.

Figure 5:
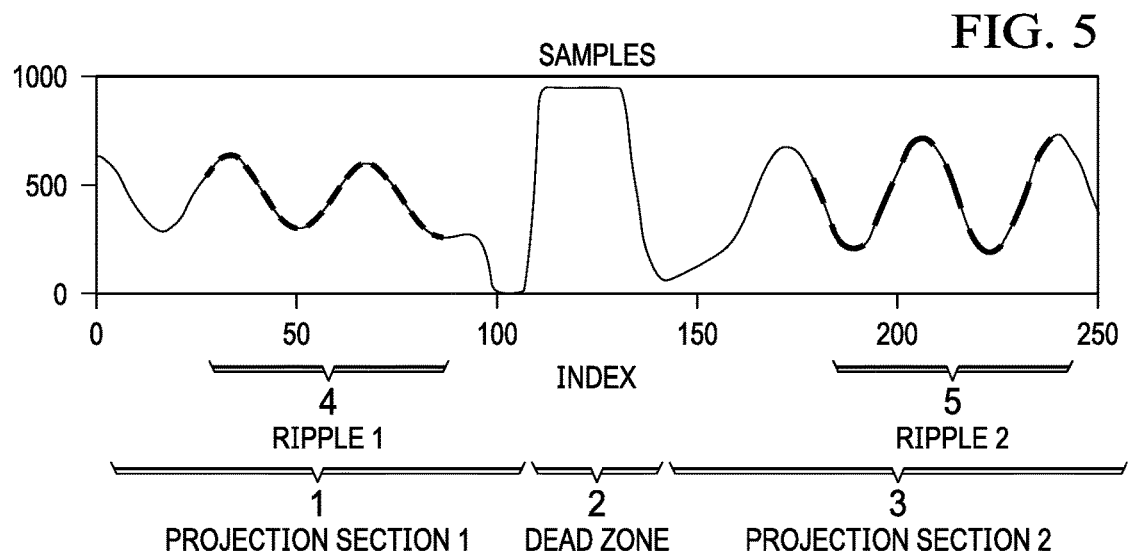
FIG. 5 shows a feedback signal from the slow axis mirror of FIG. 3, as sampled by the analog to digital converter.

The fast transitions between the first projection zone and dead zone, and between the dead zone and second projection mode, introduce unwanted resonance into the movement of the slow axis mirror 114. These unwanted resonances can be observed as ripples in the digital feedback signal 113, such as those shown in FIG. 5. Here, it can be observed that the amplitude and phase of the ripples occurring in the samples 4 from the first projection zone 1 is different than that of the amplitude and wavelength of the ripples occurring in the samples 5 from the second projection zone 3, meaning that the ripples observed in the digital feedback signal 113 during the first projection zone 1 indicate that a different resonance movement is present on the slow axis mirror 114 than that indicated by the ripples observed in the digital feedback signal 113 during the second projection zone 3. Thus, here, two undesired resonance movements of the slow axis mirror 114 are indicated by the digital feedback signal 113. As also shown in FIG. 5, the output is saturated during the dead zone 2, and thus useful data is not contained in samples taken in the dead zone 2.

The processing performed by the mirror control circuitry 116 is to generate a correction control signal 135 that is used by the mirror drive circuitry 130 in generating the drive signal 133, the purpose of which is to compensate the driving of the slow axis mirror 114 so that the undesired resonance movements (and thus the ripples observed in the digital feedback signal 113) are attenuated.

This processing will now be described in greater detail. As explained, two sets of samples of the feedback signal 123 are taken by the ADC 117, the first set of samples including the ripples 4 occurring during the first projection zone 1, the second set of samples including the ripples 5 occurring during the second projection zone 3. For any general case, these sets of samples may be taken at any points, during any projection zones, during any type of mirror drive, and need not be taken at the specific points described above. For each of these sets of samples 4 and 5, a trend function is estimated by a suitable technique, such as polynomial regression, potentially a second order polynomial regression. Therefore, first and second trend functions are generated, respectively corresponding the first and second sets of samples 4 and 5.

Shown in FIG. 6A is the first trend function A overlaid on the first set of samples 4 for the ripple B is shown in FIG. 6A. Next, the first trend function is subtracted from the first set of samples 4 to produce a first set of de-trended samples C, and the result of this subtraction is shown in FIG. 6B. The second trend function is likewise subtracted from the second set of samples 5 to produce a second set of de-trended samples.

Next, a discrete Fourier transform is performed on the first and second sets of de-trended samples, and for each of the sets of de-trended samples, a frequency bin corresponding to the associated unwanted resonance frequency is selected. Results of the discrete Fourier transform for the first set of samples 4 are shown in FIG. 6C.

These frequency bins, labeled $R_1$ and $R_2$, can be mathematically represented as:

$$R_1 = R_{1\_amp} * e^{iR1\_phase}$$

$$R_2 = R_{2\_amp} * e^{iR2\_Phase}$$

Since R1 and R2 are complex values, they can each be represented as two expressions. Thus, R1 can be represented as $R_{1\_real}$, $R_{1\_img}$, and R2 can be represented as $R_{2\_real}$, $R_{2\_img}$.

A scalar error function $f$, including both frequency bins, can be mathematically represented as:

$$f(R_1, R_2) = R_{1\_amp}^2 + R_{2\_amp}^2$$

If the scalar error function $f$ can be reduced, then the total ripple (and unwanted resonance movements) on the slow axis mirror 114 can be reduced. Thus, ideally, the scalar error function would be minimized.

Figure 7:
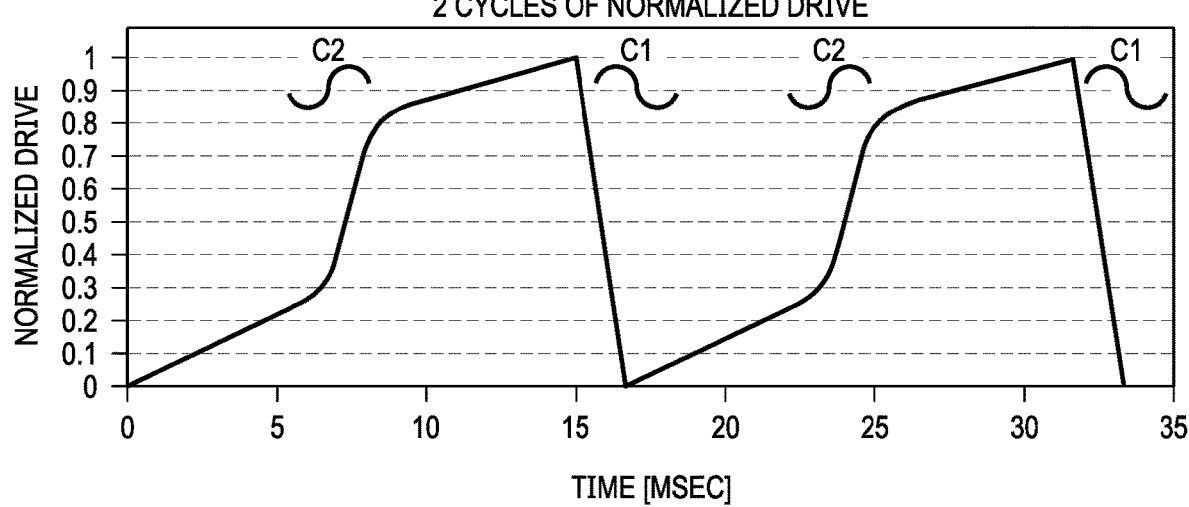
FIG. 7 shows the non-linear drive signal of FIG. 3, and locations on the non-linear drive signal where the correction control signal is applied.

This minimization, as will be explained in greater detail below, is performed by determining correction control signals C1 and C2 (collectively represented as 135 in FIG. 3) to apply to the mirror drive circuitry 130 at appropriate times, resulting in a change of the drive signal 133 that yields a minimized or substantially minimized scalar error function $f$. C1 is applied to the mirror drive circuitry 130 during retrace, while C2 is applied to the mirror drive circuitry 130 during the dead zone of the trace. Samples timing of application of C1 and C2 to the mirror drive circuitry 130 can be seen in FIG. 7.

C1 and C2 are sinusoidal waveforms, and can be represented as complex numbers $C_{1\_real}$, $C_{1\_img}$, $C_{2\_real}$, $C_{2\_img}$. As C1 and C2 are modified, during application to the mirror drive circuitry 130, a transition period occurs, and then $R_1$ and $R_2$ stabilize into a new ripple scalar error. Since $R_1$ and $R_2$ are functions of C1 and C2, $C_{1\_real}$, $C_{1\_img}$, $C_{2\_real}$, and $C_{2\_img}$ can be considered as inputs of the scalar error function $f$. The specific relation between $f$ and $C_{1\_real}$, $C_{1\_img}$, $C_{2\_real}$, $C_{2\_img}$ is unknown, and can be represented as:

$$(C_{1\_real}, C_{1\_img}, C_{2\_real}, C_{2\_img}) = \text{unknown}$$

Therefore, to minimize ripples and thus unwanted resonance movements, the goal is to find $C_{1\_real}$, $C_{1\_img}$, $C_{2\_real}$, $C_{2\_img}$ that will minimize $f$. Mathematically, this can be represented as:

$$[C_{1\_real}, C_{1\_img}, C_{2\_real}, C_{2\_img}] = \arg\min[fC_{1\_real}, C_{1\_img}, C_{2\_real}, C_{2\_img})]$$

Consequently, the problem to solve mathematically is that of finding a minimum of a multi-dimensional function. This is an optimization problem and can be solved with a variety of techniques. One suitable technique is to use a quasi-Newton method, such as the Broyden-Fletcher-Goldfarb-Shanno (BFGS technique). The BFGS technique is known to those of skill in the art, therefore, for brevity, a detailed description will be omitted from this disclosure.

To begin the Broyden-Fletcher-Goldfarb-Shanno technique, in addition to knowing the function $f$ to minimize, the gradient $\overline{\nabla f}$ of the function $f$ for $C_k$ is to be calculated, with k representing the kth iteration of the loop.

The gradient $\overline{\nabla f}$ can be numerically estimated by:
1. Measuring a current scalar error $f(C_k) = (C_{1\_real}, C_{1\_img}, C_{2\_real}, C_{2\_img})$ from the digitized feedback signal 113.
2. Changing one of the corrections in one dimension, $\vec{c} = [C_{1\_real} + \Delta c, C_{1\_img}, C_{2\_real}B, C_{2\_img}]$
3. Measuring a new current scalar error $f\vec{c}$.
4. Calculating a gradient component for this dimension as:

$$\frac{\partial f}{\partial C_{1\_real}} = \frac{f(C_k) - f(\vec{C})}{\Delta c}$$

5. Repeating steps 2-4 for all vector components of $C_k$, (a total number of 4 times in this example) to obtain the gradient $\overline{\nabla f}$ as:

$$\Delta f(C_k) = \begin{bmatrix} \frac{\partial f}{\partial C_{1\_real}} & \frac{\partial f}{\partial C_{1\_img}} & \frac{\partial f}{\partial C_{2\_img}} & \frac{\partial f}{\partial C_{2\_img}} \end{bmatrix}$$

Now, knowing $f$ and $\overline{\nabla f}$, the Broyden-Fletcher-Goldfarb-Shanno technique can be performed in order to determine appropriate values for $C_1$ and $C_2$ that will minimize $f$.

Thus, this technique as shown has canceled multiple undesired resonance movements. Where three or more undesired resonance movements are shown, this technique also functions properly, with additional frequency bins resulting from the discrete Fourier transform and being included in the equations shown above. In addition, this technique may also be applied to cancel a single undesired resonance movement, and may also be applied to cancel an undesired resonance or resonances occurring during linear drive of a mirror. Thus, the above described has been but one use case, and it should be appreciated that this technique is usable to cancel any number of undesired resonances in a mirror, regardless of how the mirror is driven.

It should be understood that through this elimination, reduction, and/or attenuation of unwanted resonant movements, the operation and functionality of the laser scanning projector itself is improved. As explained, prior art ripple suppression systems without sensors that report the actual angle of the quasi-statically driven mirror for its entire range of movement were incapable of dealing with more than one induced, unwanted resonance on the quasi-statically driven mirror, rendering the quasi-statically mirror unsuitable and unworkable for its purpose. However, using the input shaping techniques described herein, more than one induced, unwanted resonance on the quasi-statically driven mirror can be suppressed, allowing for the proper operation of the quasi-statically driven mirror in instances where the prior art quasi-statically driven mirrors and systems could not be operated. As stated, this represents a physical improvement of the capabilities of the laser scanning projector containing the quasi-statically driven mirror itself, and an improvement and advance in the technology of the system itself, resulting from the techniques described herein. In addition to representing an improvement of the capabilities and physical operation of the laser scanning projector itself, the steps, blocks, and calculations described can be thought of as a set of rules that, when followed, enables the laser scanning projector to suppress multiple induced, unwanted resonances on the quasi-statically driven, which is functionality not available in the prior art.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
a controller configured to:
receive a feedback signal from a movable mirror driven by a drive signal;
sample the feedback signal while the movable mirror moves to produce first and second sets of samples of the feedback signal;
process the first set of samples to produce a first ripple measurement;
process the second set of samples to produce a second ripple measurement;
generate first and second correction signals as a function of the first and second ripple measurements; and
apply the first and second correction signals to correct the drive signal so that unwanted resonance movement of the movable mirror is attenuated.

2. The electronic device of claim 1, wherein the controller is configured to process the first and second sets of samples to produce the first and second ripple measurements by:
estimating a first trend function from the first set of samples;
estimating a second trend function from the second set of samples;
producing first de-trended samples based upon the first set of samples and the first trend function; and
producing second de-trended samples based upon the second set of samples and the second trend function.

3. The electronic device of claim 2, wherein the controller is further configured to process the first and second sets of samples to produce the first and second ripple measurements by:
selecting a first frequency bin corresponding to a first frequency of unwanted resonance movement of the movable mirror based upon the first de-trended samples;
selecting a second frequency bin corresponding to a second frequency of unwanted resonance movement of the movable mirror based upon the second de-trended samples; and
generating an error function from the first and second frequency bins.

4. The electronic device of claim 3, wherein the controller is further configured to generate the first and second correction signals such that the first and second correction signals serve to minimize the error function.

5. The electronic device of claim 4, wherein the controller is configured to determine the first and second correction signals that minimize the error function using a quasi-Newton method.

6. The electronic device of claim 5, wherein the quasi-Newton method is a Broyden-Fletcher-Goldfarb-Shanno technique.

7. The electronic device of claim 3, wherein the first and second frequencies of unwanted resonance movement are equal.

8. The electronic device of claim 1, wherein the unwanted resonance movement comprises multiple resonances at different frequencies.

9. The electronic device of claim 1, wherein the unwanted resonance movement comprises a single resonance at a single frequency.

10. The electronic device of claim 1, wherein the controller is an application specific integrated circuit (ASIC).

11. The electronic device of claim 1, wherein the controller is an integrated circuit chip.

12. The electronic device of claim 1, wherein the controller is a microprocessor.

13. The electronic device of claim 1, further comprising an analog to digital converter to sample the feedback signal while the movable mirror moves to produce the first and second sets of samples of the feedback signal.

14. A controller, comprising:
processing circuitry configured to process received samples by:
estimating trend functions from the samples;
subtracting the trend functions from the samples to produce de-trended samples;

performing a mathematical transform on the de-trended samples to produce frequency bins corresponding to unwanted resonance movement of a movable mirror associated with the received samples;

generating an error function from the frequency bins; and generating correction signals for application to the movable mirror that serve to minimize the error function.

15. The controller of claim 14, wherein the error function is a scalar function and the correction signals are generated by using a quasi-Newton method.

16. The controller of claim 15, wherein the quasi-Newton method is a Broyden-Fletcher-Goldfarb-Shanno technique.

17. The controller of claim 14, wherein the unwanted resonance movement comprises multiple resonances.

18. The controller of claim 14, wherein the unwanted resonance movement comprises a single resonance.

19. A laser scanning projector, comprising:
a laser source configured to emit a laser;
a movable mirror driven by a drive signal;
a drive circuit configured to generate a drive signal such that as the movable mirror moves in accordance with the drive signal, an unwanted resonance movement of the movable mirror occurs; and
a controller configured to:
receive a feedback signal from the movable mirror while the movable mirror moves in accordance with the drive signal;
process the feedback signal to produce ripple measurements;
generate correction signals as a function of the ripple measurements; and
cause the drive circuit to apply the correction signals to the drive signal so that the unwanted resonance movement of the movable mirror is attenuated.

20. The laser scanning projector of claim 19, wherein the controller processes the feedback signal to produce the ripple measurements by:
estimating trend functions from the samples;
subtracting the trend functions from the samples to produce de-trended samples;
performing a mathematical transform on the de-trended samples to produce frequency bins corresponding to unwanted resonance movement of a movable mirror associated with the received samples;
generating an error function from the frequency bins; and
generating the correction signals as serving to minimize the error function.

21. The laser scanning projector of claim 20, wherein the error function is a scalar function and the correction signals are generated by using a quasi-Newton method.

22. The laser scanning projector of claim 21, wherein the quasi-Newton method is a Broyden-Fletcher-Goldfarb-Shanno technique.

23. The laser scanning projector of claim 19, wherein the laser is a single laser beam.

24. The laser scanning projector of claim 19, wherein the laser is an infrared laser beam.

25. The laser scanning projector of claim 19, wherein the movable mirror is biaxial and driven on a fast axis and a slow axis.

* * * * *